United States Patent [19]

Long

[11] 4,091,421
[45] May 23, 1978

[54] TELEVISION AFC SYSTEM HAVING COMPLEMENTARY SOUND AND PICTURE CARRIER CONTROL EFFECTS

[75] Inventor: Michael E. Long, Brookfield, Ill.

[73] Assignee: Zenith Radio Corporation, Glenview, Ill.

[21] Appl. No.: 791,894

[22] Filed: Apr. 28, 1977

[51] Int. Cl.² .............................................. H04N 5/50
[52] U.S. Cl. .................................................. 358/195
[58] Field of Search .................. 358/195, 21; 325/418, 325/423

[56] References Cited
U.S. PATENT DOCUMENTS

| 3,922,483 | 11/1975 | Indri | 358/195 |
| 3,968,325 | 7/1976 | Beriere | 358/195 |

Primary Examiner—Richard Murray
Assistant Examiner—Aristotelis M. Psitos
Attorney, Agent, or Firm—Nicholas A. Camasto; Roy A. Ekstrand

[57] ABSTRACT

A television receiver includes conventional systems for the reception and processing of a received broadcast signal. An AFC loop operative upon the tuning system frequency conversion produces complementary control effects by detection of both sound and picture carriers. A filter network provides frequency dependent phase shift of sampled IF signal which is applied to a product detector. The quadrature phase shift frequencies are selected to provide complementary control effects and avoid production of AFC offset at correct tuning.

6 Claims, 4 Drawing Figures

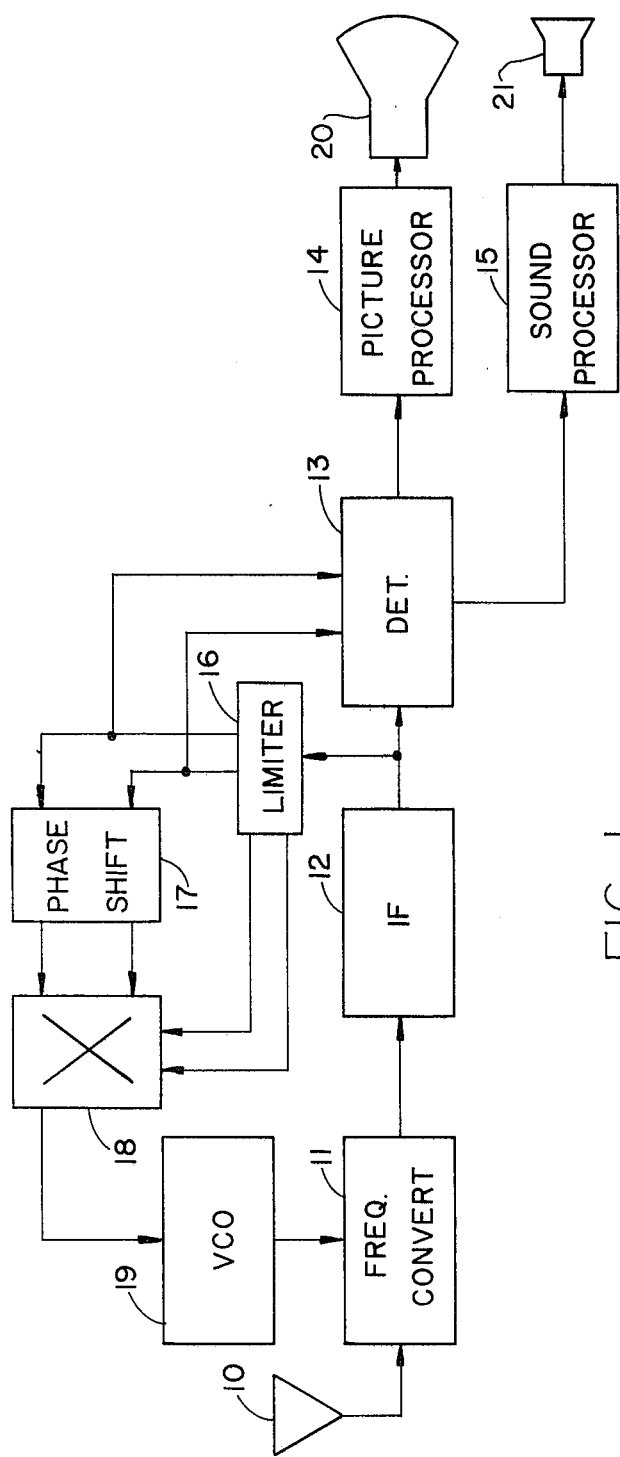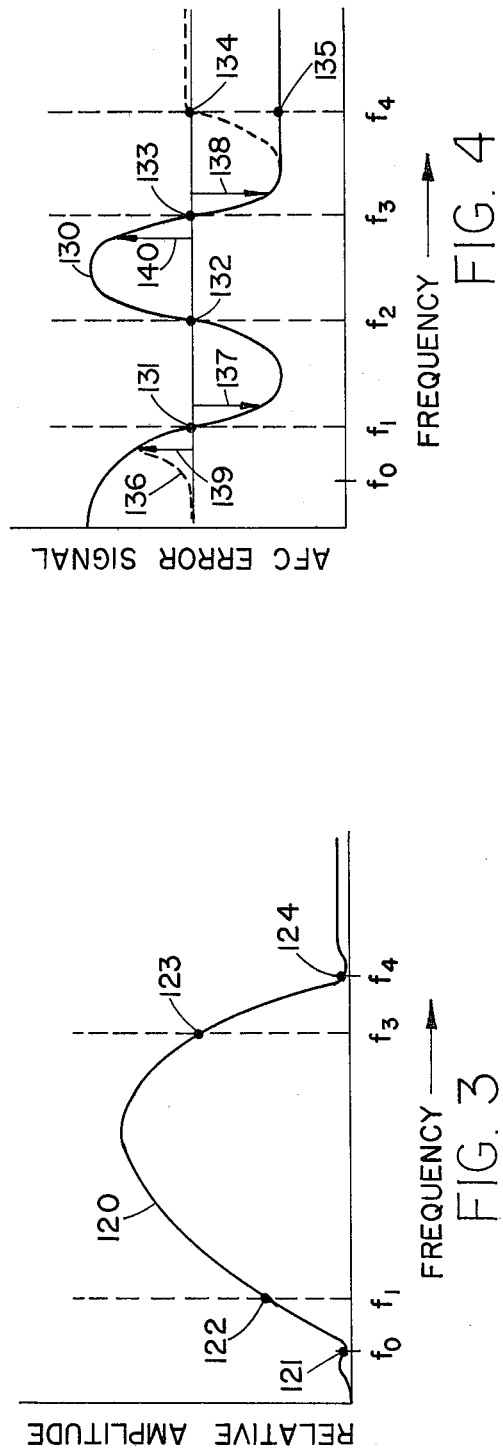

TELEVISION AFC SYSTEM HAVING COMPLEMENTARY SOUND AND PICTURE CARRIER CONTROL EFFECTS

BACKGROUND OF THE INVENTION

This invention relates to television AFC systems. The television broadcast signal comprises a carrier upon which luminance, chrominance and sound information is modulated within a limited bandwidth. The sound information is present as a frequency modulated carrier displaced from the station carrier. In the NTSC signal transmission used in the United States of America, the sound and picture carriers are frequency-spaced 4.5MHz while the channel bandwidth is 6MHz. In order to fit the frequency-spaced sound and picture carriers and other information within the prescribed bandwidth, vestigial transmission in which one sideband (in this case the lower sideband) is substantially attenuated with respect to the other sideband (upper sideband) is used. The range of broadcast frequencies assigned to television transmission are not continuous but rather forms an interrupted group of bands. However, despite this discontinuity, all assigned channels have at least one adjacent channel, and more typically two adjacent channels "flank" each channel. This means that the majority of channels have adjacent sound carrier signals 6MHz above and below their desired sound carrier and adjacent picture carriers 6MHz above and below their desired picture carrier.

The vast majority, if not all, currently manufactured television receivers include a tuning system which selects a desired channel by frequency converting the received broadcast signal, using the well-known heterodyning process, to a common intermediate frequency (IF) signal having frequency-spaced picture and sound carriers. Unfortunately, the heterodyning process also frequency converts the adjacent channel carriers to "intermediate frequency" signals. As a result, most receivers use frequency selective intermediate frequency filters which not only pass the desired intermediate frequency signal but also include trap networks which exclude or attenuate undesired adjacent channel information.

For example, in the system of assigned frequencies within the U.S. a standard IF frequency of 45.75MHz for the picture carrier has been generally established. Correspondingly, the sound carrier associated with the picture carrier is 4.5MHz lower in frequency at 41.25MHz. In the portions of the television band in which adjacent channels are present, the associated IF sound carrier of the lower adjacent channel is 47.25MHz (only 1.5MHz away from the desired channel picture carrier) while the associated picture carrier for the upper adjacent channel is 39.75MHz (only 1.5MHz away from the desired channel sound carrier). One can readily see that correct frequency conversion which accurately places the selected channel picture and sound carriers at the desired IF frequency and the undesired adjacent picture carriers at the associated trap frequencies is subject to stringent requirements.

These and other stringent tuning requirements have lead practitioners in the television art to utilize automatic frequency control systems (AFC) which maintain the correct frequency conversion within the tuning system. Such AFC systems are well-known in the art and are of almost endless variety but all may be characterized by the performance of two essential functions. The first function is generally called "pull-in" or "frequency acquisition" in which an existing frequency deviation of the picture IF carrier from the desired 45.75MHz is corrected by the closed loop response of the AFC system. The second function is generally called "hold-in" which involves the maintenance of correct frequency conversion (i.e., synchronization) once frequency acquisition has been accomplished. A basic limitation in the ability of most AFC systems to acquire correct tuning in the face of a substantial frequency deviation arises from the presence of the adjacent channel picture and sound carrier traps described above. For example, when the oscillator frequency is displaced such that the frequency conversion results in "placing" the video carrier within the adjacent channel sound trap, virtually no error signal, or control effect, is produced within the AFC system due to the picture carrier. However, the sound carrier under such conditions is "exalted" by the IF filter response and produces substantial energy within the AFC system resulting in an erroneous control voltage.

In most AFC systems, dominance by the sound carrier rather than the picture carrier, causes the system to lose its pull-in capability and "lock-out" of the system occurs. Similarly, the relative signal strength of picture and sound carriers at correct tuning is determined by the IF filter response, and under proper transmission conditions the effect of the picture carrier will dominate the AFC system. However, transmission problems such as multi-path interference or "tilt" within the antenna and distribution system can disturb this relationship resulting in the production of an overriding control effect produced by detection of the sound carrier which again can produce a lock-out condition.

The problem of AFC lock-out through receiver detuning causing intrusion of the picture carrier into the adjacent channel sound trap has been minimized by development of AFC systems in which the sound carrier produces a control effect of the proper polarity to aid or complement that produced by the picture carrier and actually control the AFC system when the frequency deviation places the picture carrier within the adjacent sound trap. One such system shown in U.S. Pat. No. 3,459,887 uses an automatic frequency control system in which the balance of a diode-pair AFC detector is offset, or biased, to produce the desired complementary control effect by the sound carrier. The described system achieves substantial improvement in AFC pull-in when the picture carrier is attenuated by the adjacent channel sound trap. A somewhat similar system is shown in U.S. Pat. No. 3,968,325 in which a product detector, or multiplier, simultaneously driven by a pair of IF signals emmanating from the intermediate frequency filter performs the AFC detection function. A frequency-dependent phase shift between the two IF signals is introduced such that the frequency deviation of the intermediate frequency signal is converted to a phase deviation to which the product detector responds. The AFC response provides a reduction of the erroneous AFC voltage produced by detected noise in the region of the received channel sound carrier and a complementary sound carrier control effect similar to that of the U.S. Pat. No. 3,459,887. The creation of a complementary sound carrier control effect in both systems provide improved pull-in or acquisition when the frequency deviation is such that the picture and sound carriers are above the correct frequencies. However, such systems do not produce complementary control effects when the frequency deviation is low.

Another problem caused by sound carrier detection in all AFC systems whether complementary or not is the production of an offset voltage when the receiver is correctly tuned. Fortunately, in the majority of receivers, the amount of sound carrier energy applied to the AFC system at or near correct tuning is reduced by the presence within the IF response of a sound trap used to inhibit the production of excessive chrominance-sound beat caused by detector non-linearity. As a result, the degree of sound carrier frequency offset is greatly reduced. However, the more recently employed synchronous detection systems have improved detection linearity and very little chrominance-sound beat signal is produced. This is advantageous because it allows the use of an extended bandwidth intermediate frequency filter, that is, a filter without a trap network for the attenuation of the sound carrier. The benefits realized by such extended bandwidth IF systems are numerous. For example, more linear signal translation, particularly the chrominance information, is achieved and a greater range of receiver tuning is tolerated by the system. Unfortunately, the removal of the sound trap from the IF response also allows substantial sound carrier energy to reach the AFC detector and produce a substantial offset voltage which under some circumstances mistunes the receiver.

Accordingly, it is a general object of the present invention to provide an improved automatic frequency control system. It is a more particular object to provide an improved automatic frequency control system in which a complementary control effect due to sound carrier detection is realized under conditions of high and low frequency error. It is another object of the present invention system to provide an improved automatic frequency control system for use with extended bandwidth intermediate frequency filters.

SUMMARY OF THE INVENTION

In a television tuning system, for receiving a broadcast signal having frequency-spaced sound and picture carriers, in which a voltage controlled oscillator provides a source of heterodyning signal for a frequency converter which translates the broadcast signal to an intermediate frequency signal having frequency-spaced intermediate frequency picture and sound carriers and in which automatic frequency control means produce an error voltage for controlling the frequency of the oscillator by phase detection of input signals comprising samples of the intermediate frequency signal having a frequency dependent relative phase difference, the improvement comprises means imposing a frequency dependent phase shift characteristic between the samples of intermediate frequency signal, the characteristic having three quadrature-phase points at frequencies substantially equal to the ihtermediate frequency sound carrier, the intermediate frequency picture carrier and a predetermined frequency therebetween.

BRIEF DESCRIPTION OF THE DRAWINGS

The features of the present invention which are believed to be novel are set forth with particularly in the appended claims. The invention, together with further objects and advantages thereof, may best be understood by reference to the following description taken in conjunction with the accompanying drawings, in the several figures of which like reference numerals identify like elements, and in which:

FIG. 1 is a block diagram of a television receiver tuning system constructed in accordance with the present invention.

FIG. 3 is a frequency response curve of the IF filter.

FIG. 4 is a frequency response curve of the present invention AFC system.

DESCRIPTION OF THE PREFERRED EMBODIMENT

Figure 2:
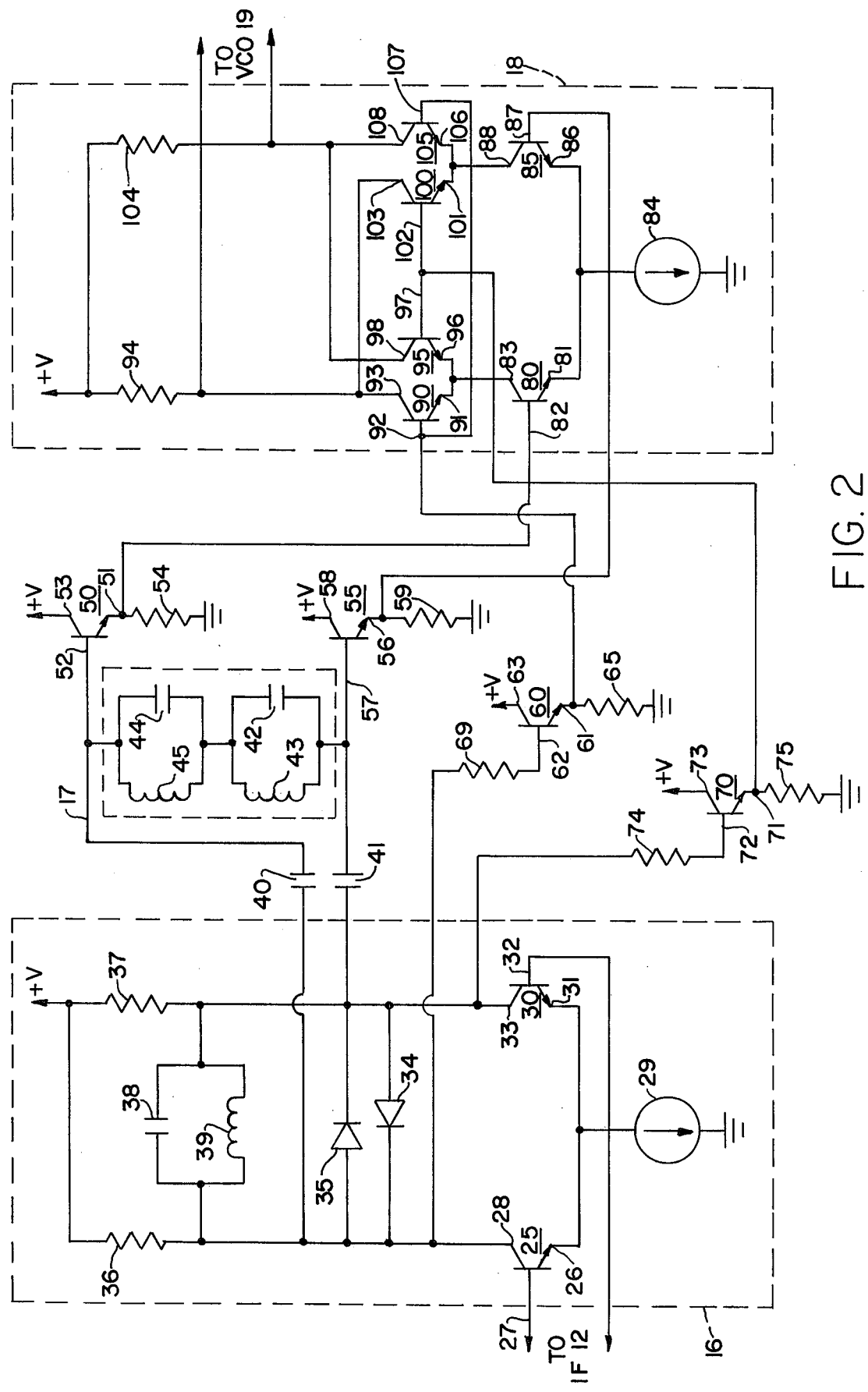
FIG. 2 is a schematic detail of portions of the present invention tuning system.

FIG. 1 shows a television receiver constructed in accordance with the present invention. A receiving antenna 10 is coupled to a frequency converter 11, the output of which is coupled to an intermediate frequency filter/amplifier 12. The output of filter 12 is coupled to a synchronous detector 13 and a limiter 16. The outputs of detector 13 are coupled to a picture tube 20 via a picture processor 14 and to a speaker 21 via a sound processor 15. Limiter 16 is coupled to a pair of inputs to a phase shift network 17 and to one input of a product detector 18. The outputs of phase shifter 17 are also coupled to the inputs of multiplier 18. The output of multiplier 18 is coupled to a voltage control oscillator (VCO) 19, which in turn is coupled to frequency converter 11.

In operation, a received television broadcast signal incident on antenna 10 develops an input signal for frequency converter 11 which in response to the output of VCO 19 and the broadcast signal converts the latter to an intermediate frequency signal by the familiar heterodyning process. Intermediate frequency filter/amplifier 12 imposes a restricted bandwidth frequency characteristic upon the frequency converted signal, amplifies it and couples it to picture and sound information detector 13. The response characteristic of IF filter 12 (shown in FIG. 3 as curve 120) maintains the respective IF picture and sound carriers, designated $f_3$ and $f_1$ respectively on the frequency axes, at the relative signal gains shown by intercepts 123 and 122 respectively. Also shown are the trap responses for the adjacent channel picture carrier (at frequency $f_o$) which is shown at intercept 121 and the adjacent channel sound carrier (designated $f_4$) which is showh at intercept 124.

Detector 13 should be understood to include well-known synchronous detection circuitry which typically includes a source of oscillator signal maintained in synchronism with the picture carrier output of IF filter 12. As is known, synchronous detectors of which detector 13 is representative perform a substantially linear signal demodulation process in which individual picture and sound information is recovered without the production of excessive cross products such as the annoying chrominance-sound beat signal. Because this linear process removes the need for a sound If trap, the response of IF amplifier 12 in the region surrounding sound carrier $f_1$ is a substantially continuous response and is not subject to the discontinuities associated with sound traps used in receivers having non-linear detectors. While it is believed most advantageous to use the present invention AFC system in combination with an extended bandwidth IF filter and linear synchronous type picture detector, it will become apparent to those skilled in the art that the present invention system may also be used advantageously in systems having a sound trap in the IF and a non-linear type picture detector.

Similarly, picture processor 14 should be understood to include conventional luminance and chorminance processing circuitry which develops appropriate intensity control signals for application to cathode ray tube display device 20. Also, sound processor 15 includes conventional detection circuitry which recovers the frequency modulated sound information and amplifies it to a power level sufficient to drive speaker 21. Finally, the receiver shown in FIG. 1 would of course include conventional deflection systems to operate CRT 20.

Limiter 16, phase shift network 17, product detector 18 and VCO 19 form the automatic frequency control system of the present invention. The signal emmanating from IF filter 12 which is applied to limiter 16 comprises an amplitude-modulated picture carrier and spaced-apart frequency modulated sound carrier. Limiter 16, which may be constructed in accordance with any of the several well-known amplitude limiting circuits within the art. removes virtually all the amplitude variations present in the applied signal leaving a substantially constant amplitude output signal which is representative of the intermediate frequency picture carrier. The amplitude limited signal is applied to one input of product detector 18 supplying a gating signal for the detector which is free of any frequency dependent phase shift and therefore operating as a "reference" signal. In contrast the two sample outputs of limiter 16 coupled by phase shift network 17 to the respective phase detection inputs of detector 18 are subjected to a frequency-dependent phase shift relative to the "reference" sample.

This phase shift is best described by simultaneous reference to FIG. 4 which shows a frequency characteristic plot of AFC error signal. Frequency $f_o$ corresponds to the adjacent channel video carrier, $f_1$ to the selected channel sound carrier, $f_2$ to a frequency of approximately 43.5MHz, $f_3$ to the desired channel picture carrier, and $f_4$ to the adjacent channel sound carrier. Solid curve 130 shows the response of the AFC system due primarily to the influence of phase shift network 17 exclusive of the effect of IF filter 12. Dashed-line curve portion 136 which departs from solid curve 130 above and below the selected channel shows the influence of the response characteristic of IF filter 12. Because IF filter 12 forms a portion of the signal path completing the AFC control loop, the operative AFC frequency response is that of curve 130 where coincident with curve 136 and that of curve 136 where the curves diverge. Intercepts 131 and 133 show the respective AFC error voltages or control effects produced by AFC detection of the sound and picture carriers respectively when the frequency conversion is "correct".

In the event the frequency conversion is incorrect causing the frequency of IF signals to deviate for example to the high side, that is, above the desired frequencies, a pair of control voltages shown by arrows 137 and 138 are produced by the AFC detection of sound and picture carriers respectively. As can be seen from examination of FIG. 4, both sound and picture carrier produced error voltages are of the same polarity and are therefore complementary in that both cause the frequency of VCO 19 to change to the same direction (in this case reducing IF frequency) thereby aiding in the restoration of correct frequency conversion. Similarly, an incorrect frequency conversion which causes an If signal frequency deviation to the low side produces control effect voltages 139 and 140 for the respective sound and picture carrier. As in the case of high side deviation, it should be noted that the control voltages generated are again of the same polarity and are therefore complementary in that their combined effect causes VCO 19 to reduce IF signal frequency and again restore the correct frequency conversion. As mentioned above, the prior art AFC systems only provide a complementary sound carrier control effect when a "high side" error is present. In contrast, the present invention system provides a complementary control effect arising out of sound carrier detection under both high side and low side frequency errors. This represents an important aspect of the present invention system and produces a substantial increase of AFC pull-in range. Also because the sound carrier complementary effect is "two sided" the increased pull-in range may remain symmetrical about the correct picture carrier frequency.

Another important aspect of the present invention AFC system becomes apparent by noting that a zero error voltage is produced by both picture and sound carriers under correct tuning conditions. The zero voltage condition for the picture carrier is, of course, consistent with well-known frequency control practice. However, the zero voltage for sound carrier $f_1$ represents an important departure of the present invention system from prior AFC systems. This aspect is of particular importance in the event that a linear type detector and extended bandwidth IF are used. It will be appreciated by those skilled in the art that a substantial amount of sound carrier energy may be present within the AFC control loop without the production of any offset voltage because no AFC voltage resulting from sound carrier detection occurs at correct tuning. As a result, unlike prior art systems in which an offset voltage of one polarity or another results in the event sound carrier energy is coupled to the AFC detector, no offset occurs in the present invention system.

FIG. 2 shows a schematic detail of portions of the AFC loop set forth in FIG. 1. Limiter 16 includes a differential amplifier formed by a first transistor 25 having an emitter 26, a base 27 coupled to IF 12 and a collector 28 coupled to a source of positive voltage (+V) by a load resistor 36 and a second transistor 30 having an emitter electrode 31 coupled to emitter 26, a base electrode 32 coupled to IF 12, and a collector electrode 33 coupled to a source of positive operating potential (+V) via a load resistor 37. A current source 29 couples the junction of emitters 26 and 31 to ground in accordance with well-known differential amplifier construction. A pair of oppositely-poled limiter diodes 34 and 35 are coupled between collectors 28 and 33. A parallel resonant tuned circuit formed by a capacitor 38 and an inductor 39 is also coupled between collectors 28 and 33.

A first buffer transistor 50 has an emitter electrode 51 coupled to ground by a resistor 54, a base electrode coupled to collector 28 by a capacitor 40, and a collector electrode 53 coupled to a source of positive voltage (+V). A second buffer transistor 55 has an emitter electrode 56 coupled to ground by a resistor 59, a base electrode 57 coupled to collector 33 by a capacitor 41, and a collector electrode 58 coupled to a source of positive potential (+V). A phase shift network 17 comprises the series combination of a first parallel resonant network of a capacitor 44 and an inductor 45 and a second parallel resonant network of a capacitor 42 and an inductor 43 coupled between base 52 of transistor 50 and base 57 of transistor 55.

Product detector 18 comprises a doubly balanced demodulator of the type well-known in the art and includes transistors 80, 85, 90, 95, 100, and 105 and a current source 84. Transistor 80 has an emitter electrode 81, a base electrode 82 connected to emitter 51, and a collector electrode 83. Transistor 85 has an emitter electrode 86 connected to emitter 81, a base electrode 87 connected to emitter 56 and a collector electrode 88. Current source 84 couples the junction of emitters 81 and 86 to ground. Transistor 100 has an emitter electrode 101 connected to collector 88, a base electrode 102 and a collector electrode 103. Transistor 105 has an emitter electrode 106, a base electrode 107 and a collector electrode 108 coupled to a source of operating potential (+V) by a load resistor 104. Transistor 90 has an emitter electrode 91 connected to collector 83, a base electrode 92 connected to base 107 and a collector electrode 93 connected to collector 103 and coupled to a source of operating potential (+V) by a load resistor 94. Transistor 95 has an emitter electrode 96 connected to collector 83, a base electrode 97 connected to base 102 and a collector electrode 98 connected to collector 108.

A buffer transistor 70 includes an emitter electrode 71 coupled to ground by a resistor 75, a base electrode 72 coupled to collector 33 by a resistor 74 and a collector electrode 73 coupled to a source of positive operating potential (+V). A buffer transistor 60 has an emitter electrode 61 coupled to ground by a resistor 65, a base electrode 62 coupled to collector 28 by a resistor 64 and a collector electrode 63 coupled to a source of positive operating potential (+V). Emitter 71 is connected to bases 97 and 102 and emitter 61 is connected to bases 92 and 107.

In operation, the output of IF filter 12 which comprises a differential signal voltage causes alternate conductions on interleaved cycle portions by differentially coupled transistors 25 and 30. The conduction of transistor 25 produces a voltage drop across resistor 36 while that of transistor 30 produces a voltage drop across resistor 37. The combined currents of transistors 25 and 30 carried to ground by current source 29 which in accordance with well-known practice maintains a constant conduction level. These alternating conductions of transistors 25 and 30 produce a differential signal voltage at collectors 28 and 33. The amplitude of this differential voltage is limited by the actions of cross-coupled diodes 34 and 35 which conduct on alternate portions of the cycle. As a result, amplitude variations present in the applied IF signal are not reproduced at the collectors of transistors 25 and 30. Instead a substantially constant amplitude "squared" signal results. However such squared signals are laiden with harmonic signals which if allowed to remain would interfere with AFC function. In order to exclude these harmonic signals produced in the limiting process, a filter network comprising capacitor 38 and inductor 39 is coupled between collectors 28 and 33. The output signals at collectors 28 and 33 which are substantially sinusoidal representations of the IF picture carrier are applied through a pair of capacitors 40 and 41 to a pair of emitter follower amplifiers 50 and 55 respectively.

The parallel resonant circuits (capacitor 42 and inductor 43 together with capacitor 44 and inductor 45) within phase shift network 17 cooperate with capacitors 40 and 41 to produce a phase shift of the signals at emitters 51 and 56 relative to those at collectors 28 and 33. Because the components within the combination of phase shift network 17 and coupling elements 40 and 41 are reactive, they exhibit a complex "multi-resonant" transfer characteristic in which the phase shift produced is dependent upon the frequency of signal applied. Therefore, variations of IF signal frequency caused for example by changes in tuner conversion produce varying phase shifts between the output of limiter 16 and the output signals of buffer stages 50 and 55.

For reasons which will be more apparent below, the element values of capacitors 40 and 41 and the parallel resonant circuits in filter 17 are selected to impart quadrature phase shift conditions to signals having frequencies equal to those of the picture IF carrier, the sound IF carrier and an intermediate frequency therebetween (preferably 43.5MHz). As is known, this frequency and phase characteristic may be achieved by a variety of circuit combinations and is, to some extent, dependent upon the peripheral circuitry, however, it has been found advantageous to utilize network component values for capacitors 40, 41, 42 and 44 and inductors 43 and 45 which produce a pair of frequency poles at the sound and picture IF frequencies and a zero at the intermediate frequency of 43.5MHz. The following combination of component values has been found to provide this characteristic. However, it will be apparent to those skilled in the art that they are representative of a number of workable combinations all of which fall within the spirit of the present invention.

Capacitor 40: 1.0pf
Capacitor 41: 1.0pf
Capacitor 42: 100pf
Capacitor 44: 100pf
Inductor 43: 0.15μH
Inductor 45: 0.12μH The output of limiter 16 is coupled to a second pair of buffer stages 60 and 70 substantially free of any frequency dependent phase shift. As a result, the output signals of buffers 60 and 70 remain substantially representative of the IF picture carrier originally applied to transistors 25 and 30. Detector 18 forms the well-known doubly-balanced product, or quadrature, detector often used in the art. The outputs of transistors 60 and 70 are applied to the bases of transistors 90 and 105 and to transistors 95 and 100 while the phase shifted output signals from transistors 50 and 55 are coupled to the bases of transistors 80 and 85. Transistors 90, 95, 100 and 105 are "cross coupled" in a configuration which results in paired operation by transistors 90 and 105 in alternation with transistors 95 and 100. Because of this cross coupling, detector 18 functions much like a pair of differential amplifiers each coupled to transistors 80 and 85 and each operative during half the cycle of applied signal. In response to the applied keying signals from transistors 60 and 70, transistors 80 and 85 are alternatively turned on during alternate half portions of the signal cycle and in accordance with known techniques of product detection, the relative phase between the original IF signal produced by limiter 16 and the frequency dependent phase shifted If signal causes the production of a differential voltage across resistors 94 and 104. Because this differential voltage is a function of the imparted phase shift which in turn is a function of frequency deviation, the voltage produced is appropriate for use as an AFC error signal.

As is known, product or quadrature detectors such as detector 18 produce a zero output when the input signals have either a leading or lagging realtive phase of 90°. In addition, they produce opposite polarity "maxima" output voltages for conditions of 0° and 180° relative phase. In view of the foregoing, it will be apparent to those skilled in the art that the component values within phase shift network 17 and capacitors 40 and 41 are selected to result in quadrature phase displacements at the frequencies of the picture and sound carriers as well as the intermediate (43.5MHz) and that this selection is directed to the attainment of zero value AFC error voltages at these frequencies. Further, it will also be apparent that the interleaved alternate polarity voltage "maxima" provide the same polarity of AFC voltage slope in the regions of the picture and sound carriers which facilitates a complementary sound carrier control effect for frequency deviations in both directions.

What has been shown is a novel automatic frequency control system in which a frequency dependent phase shift network provides novel AFC voltage generating performance characterized by complementary sound carrier detection control effects for frequency deviations both above and below the desired tuning. The system shown provides a zero AFC offset under correct tuning conditions despite the presence of substantial sound carrier energy within the AFC system.

What is claimed is:

1. In a television tuning system, for receiving a broadcast signal having frequency-spaced sound and picture carriers, in which a voltage controlled oscillator provides a source of heterodyning signal for a frequency converter which translates said broadcast signal to an intermediate frequency signal having frequency-spaced intermediate frequency picture and sound carriers and in which automatic frequency control means produce an error voltage for controlling the frequency of said oscillator by phase detection of input signals comprising samples of said intermediate frequency signal having a frequency dependent relative phase difference, the improvement comprising:

means imposing a frequency dependent phase shift characteristic between said samples of said intermediate frequency signal, said characteristic having three quadrature-phase points at frequencies substantially equal to said intermediate frequency sound carrier, said intermediate frequency picture carrier and a predetermined frequency therebetween.

2. The improvement set forth in claim 1 wherein said means imposing include a filter network having poles at the frequencies of said intermediate frequency picture and sound carriers.

3. The improvement set forth in claim 2 wherein said automatic frequency control means include a multiplier and wherein said filter network comprises first and second parallel resonant circuits serially coupled between the input signals to said multiplier.

4. The improvement set forth in claim 3 wherein said predetermined frequency is substantially centered between said intermediate frequency picture and sound carriers.

5. In a television tuning system, for receiving a broadcast signal having frequency-spaced sound and picture carriers, having a voltage controlled oscillator providing a source of heterodyning signal for a frequency converter which translates said broadcast signal to an intermediate frequency signal having frequency-spaced intermediate frequency picture and sound carriers, an intermediate frequency filter coupled to said frequency converter having a predetermined frequency response coupling said picture and sound carriers to a common picture and sound information detector, and automatic frequency control means producing an error voltage for controlling the frequency of said oscillator, the improvement comprising:

means producing an automatic frequency control characteristic having a first zero output point at the frequency of said intermediate frequency picture carrier and a second zero output point at the frequency of said intermediate frequency sound carrier and having like polarity error voltage slopes at the frequencies of said intermediate frequency picture and sound carriers.

6. In a television tuning system, for receiving a broadcast signal having frequency-spaced sound and picture carriers, having a voltage controlled oscillator providing a source of heterodyning signal for a frequency converter which translates said broadcast signal to an intermediate frequency signal having frequency-spaced intermediate frequency picture and sound carriers, an intermediate frequency filter coupled to said frequency converter having a predetermined frequency response coupling said picture and sound carriers to a common picture and sound information detector, and automatic frequency control means controlling the frequency of said oscillator, the improvement comprising:

means producing an automatic frequency control signal which includes a first control effect produced by said intermediate frequency picture carrier and a second complementary control effect produced by said intermediate frequency sound carrier, said first and second control effects retaining like polarity for frequency deviations of said intermediate frequency signal above and below the desired frequency and having zero effect at said desired frequency.

* * * * *